US 6,575,101 B2

(12) United States Patent
Blute et al.

(10) Patent No.: US 6,575,101 B2
(45) Date of Patent: Jun. 10, 2003

(54) COUPLING ARRANGEMENT FOR A TRAIN OF HIGHWAY TRAILERS

(75) Inventors: Terence Stanley Blute, Hope Valley (AU); Peter Wayne Gilsmore, West Beach (AU); Jann Michael Tappert, Para Hills (AU)

(73) Assignee: Air-Ride (S.A.) Pty LTD, South Australia (AU)

( * ) Notice: Subject to any disclaimer, the term of this patent is extended or adjusted under 35 U.S.C. 154(b) by 0 days.

(21) Appl. No.: 09/953,243

(22) Filed: Sep. 17, 2001

(65) Prior Publication Data

US 2002/0040881 A1 Apr. 11, 2002

Related U.S. Application Data

(63) Continuation of application No. PCT/AU00/00205, filed on Mar. 16, 2000.

(30) Foreign Application Priority Data

Mar. 16, 1999 (AU) .............................................. PP9232

(51) Int. Cl.[7] .................................................. B61F 1/00
(52) U.S. Cl. ...................................... 105/215.2; 105/4.2
(58) Field of Search ............................... 105/4.3, 72.2, 105/4.2, 215.1, 215.2

(56) References Cited

U.S. PATENT DOCUMENTS 4,841,872 A   6/1989  Wicks et al. ................. 105/4.3
5,107,772 A   4/1992  Viens ........................... 105/159
5,456,484 A  10/1995  Fontaine ....................... 280/434
5,826,517 A * 10/1998  Larson, Jr. et al. .......... 105/4.3

FOREIGN PATENT DOCUMENTS

EP        0403021 A1     12/1990
WO        WO95/34453     12/1995

* cited by examiner

Primary Examiner—S. Joseph Morano
Assistant Examiner—Robert J. McCarry, Jr.
(74) Attorney, Agent, or Firm—Jacobson Holman PLLC

(57) ABSTRACT

A coupling arrangement for forming a train of highway trailers, including at least one leading trailer having a rearwardly disposed locating device and a retractable highway wheel assembly, at least one following trailer having a forwardly disposed locating device and a retractable highway wheel assembly, a coupler removably and pivotally mounted upon a railway bogie and including a forwardly projecting coupling device and a rearwardly disposed coupling device, the former coupling device engageable with the leading trailer's rearwardly disposed locating device and the latter coupling device engageable with the following trailer's forwardly disposed locating device. Upon engagement of the respective coupling and locating devices the forwardly projecting coupling device forms a generally rigid beam from the rear of the leading trailer to the interface between the coupler and the bogie.

26 Claims, 12 Drawing Sheets

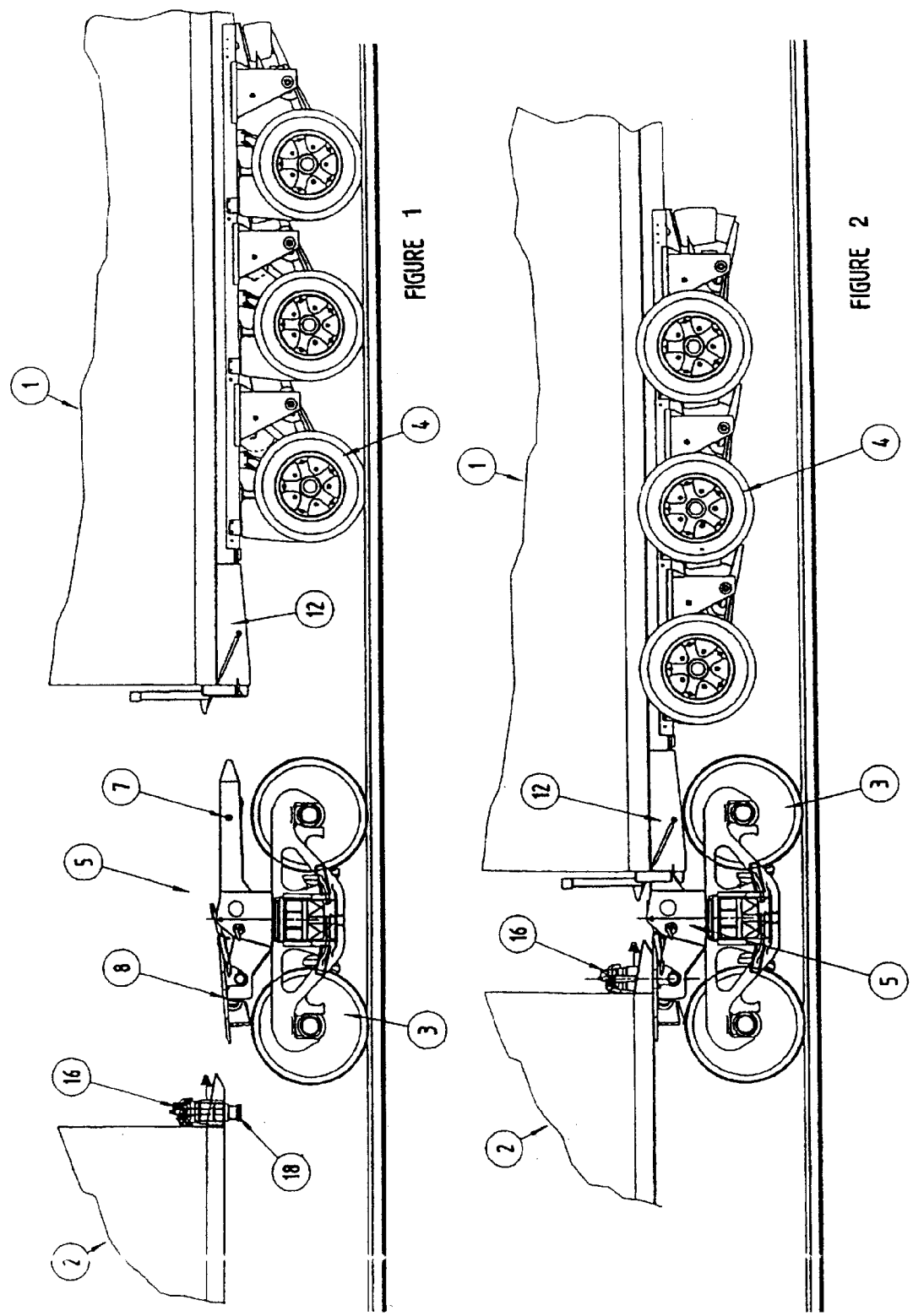

COUPLING ARRANGEMENT FOR A TRAIN OF HIGHWAY TRAILERS

This application is a continuation of PCT/AU00/00205 filed on Mar. 16, 2000.

FIELD OF THE INVENTION

The present invention relates to an improved coupling arrangement that may be used with conventional railway bogies for the purpose of forming a train of highway trailers.

BACKGROUND OF THE INVENTION

Highway trailers that can be used on both highways and railways have been known for some time and the economic benefits resulting from the use of trailers that may be used in either a "road" mode or a "rail" mode are well established.

Generally, these types of trailers include retractable wheel assemblies wherein the highway wheels may be retracted and drawn closer to the underside of the trailer. This enables a railway bogie to be placed under the trailer such that when the trailer's wheels are retracted, the trailer becomes supported by the railway bogie and hence may be transported by rail.

Various forms of interconnection between the trailer and the railway bogie have been proposed, but these have generally involved significant alteration to either the trailer, the railway bogie, or both. In particular, it has been usual for the railway bogie to be placed underneath the rear of a leading trailer to support the weight of that trailer. Connection with the following trailer has usually been effected by directly interconnecting the two trailers.

Whilst this arrangement has been relatively successful, it has required the retractable wheel assembly to be capable of sliding along the underside of the trailer to ensure no interference between the highway wheel assembly of the trailer and the railway bogie. Consequently, there has been a requirement placed upon highway trailers to include extra mechanisms to effect the sliding of the wheel assembly away from the rear of the trailer. This results in increased manufacturing cost of such trailers and a reduction in the pay load of the trailers both in "rail" and "road" mode due to the extra weight of the sliding mechanism.

The requirement for a trailer to include a sliding mechanism for a retractable wheel assembly is avoided in the present invention in that the improved arrangement retains the railway bogie at a sufficient distance from the rear of the leading trailer such that there is no interference between the railway bogie and the wheels when the wheel assembly is retracted. An improved coupler according to the present invention has the benefit of reducing the cost of manufacture of the trailers and the weight of the trailers, which in turn, improves the pay load of hauling the trailers in both the "road" and "rail" mode.

SUMMARY OF THE INVENTION

The present invention provides a coupling arrangement for forming a train of highway trailers including;
- at least one leading trailer including a rearwardly disposed locating means and a retractable highway wheel assembly;
- at least one following trailer including a forwardly disposed locating means and a retractable highway wheel assembly; and
- a coupler removably and pivotally mounted upon a railway bogie, the coupler including a forwardly projecting coupling means and a rearwardly disposed coupling means, the forwardly projecting coupling means capable of engagement with the leading trailer's rearwardly disposed locating means and the rearwardly disposed coupling means capable of engagement with the following trailer's forwardly disposed locating means;
- such that, upon engagement of the respective coupling means with the respective locating means, the forwardly projecting coupling means forms a generally rigid beam from the rear of the leading trailer to the interface between the coupler and the railway bogie, and upon generally vertical retraction of the leading trailer highway wheel assembly to the underside thereof, no interference between the highway wheel assembly and the railway bogie occurs.

The formation of a generally rigid beam from the rear of the trailer to the railway bogie by the forwardly projecting coupling means of the coupler when engaged with the locating means allows the railway bogie to be maintained at a sufficient distance from the rear of the trailer such that there is no interference between the highway wheel assembly and the railway bogie. As a result, the trailer is not required to include any means to slide the highway wheel assembly forward to avoid interference with the railway bogie.

In a preferred form of the present invention, the forwardly projecting coupling means includes a V shaped member generally residing in a horizontal plane, with the rearwardly disposed locating means including a generally vertically aligned pin such that the V shaped member forms a "gathering" mechanism by which the coupling means "gathers" the pin and thus locates the forwardly projecting coupling means. It is also preferred that the rearwardly disposed locating means include at least one load bearing surface that will resist a generally vertically downwardly directed force and at least one load bearing surface that will resist a generally vertically upwardly directed force. Preferably, when correctly located, the V shaped member rests upon the at least one load bearing surface resisting generally vertically upwardly directed forces and the at least one load bearing surface resisting generally vertically downwardly directed forces.

It is preferred that the engagement of the forwardly projecting coupling means with the rearwardly disposed locating means occur by way of a forwardly disposed engagement means located at the centre of the V shaped member which is capable of releasable engagement with the pin of the rearwardly disposed locating means, thereby retaining the free ends of the V shaped member in contact with the load bearing surfaces in the rearwardly disposed locating means when the pin is engaged in the forwardly disposed engagement means. Preferably the forwardly disposed engagement means includes a self-latching mechanism that engages the pin as the coupler is urged toward the locating means and the pin travels into the forwardly disposed engagement means at the centre of the V shaped member.

It is also preferred that the rearwardly disposed coupling means be pivotally connected to the coupler, the aixs of rotation residing in a generally horizontal plane thereby enabling angular movement of the coupling means with respect to the following trailer. Preferably, the rearwardly disposed coupling means also includes a V shaped member generally residing in a horizontal plane, and the forwardly disposed locating means on the following trailer includes a generally vertically aligned pin similarly forming a gathering mechanism by which the coupling means gathers the locating means pin.

It is also preferred that the engagement of the rearwardly disposed coupling means with the forwardly disposed locating means occur by way of a rearwardly disposed engagement means located at the centre of the rearwardly disposed V shaped member which engages the locating means pin. For the forwardly disposed locating means, it is preferred that the pin be retractable. In this respect, for convenience and safety reasons, it is preferred that the pin be retracted upwards to an inoperative position and extended downward to an operative position.

The generally V shaped member and the pin of either the forward or rearward coupling mechanisms assists in overcoming difficulties that have been experienced with prior coupling arrangements in relation to coupling the railway bogie with the trailer. Some prior arrangements have included converging side walls in the coupling mechanism of both the bogie and the trailer, effectively forming a mating male-female connection. Disadvantageously, this type of arrangement increases the friction associated with coupling the mechanism and hence increases the difficulty in obtaining a secure coupling between the bogie and the trailer. In the preferred embodiment, the only frictional force resisting the passage of the pin to the centre of the member is that due to the contact between the pin and the inner side wall of the V shaped member.

It is preferable that the pin engaging means for either or both of the forwardly and rearwardly projecting coupling means include a generally U shaped jaw that is pivotally connected to the coupler and adapted to receive the respective locating means pin such that as the pin is introduced into the mouth of the jaw and continues toward the centre of the V shaped member, the jaw pivots and one arm of the jaw locates behind the pin with respect to the pin's direction of travel such that the arms of the U shaped jaw then reside generally transverse to the direction of the arms of the V shaped member. It is further preferred that a generally laterally disposed locking wedge be provided to wedge the jaw into an engaged position once the engagement means has fully received the pin. Once the locking wedge is urged into a position corresponding to engagement of the pin, it prevents the jaw from pivoting and hence prevents the release of the locating means pin by the jaw. Preferably, the locking wedge is operated by linkages that are connected to a handle disposed on the exterior of the coupler, thereby enabling operation by hand. In a particularly preferred embodiment, the locking wedge is biased such that it is urged into an engaging position once the pin is fully received into the locking jaw with one arm thereof located behind the pin. In this embodiment, the locking wedge is urged against its bias and withdrawn from its engaging position by the operation of linkages. Preferably, a retention means is provided to retain the locking wedge in its withdrawn position against its bias, the retention means being released upon the reception of the pin into the pivotally connected jaw.

In prior art arrangements, some problems have been experienced with the integrity of coupling between the bogie and the trailer. In some arrangements, a pin has been used to engage the coupling mechanism. However, the pin has generally been used to lock the coupling mechanism by forcing the pin generally upwardly such that it resides within overlapping apertures thereby locking the apertured members together. This type of arrangement has proven not to be fail safe in that gravity and other forces acting upon the pin during travel have in some instances caused the pin to drop out of its locking position. In rare instances, this has resulted in a complete disengagement of a railway bogie and trailer thereby causing an extreme safety risk. The inclusion of a generally laterally disposed locking wedge assists in overcoming this difficulty.

In a particularly preferred embodiment, the pins of either or both of the locating means includes a generally radially outwardly directed flange that acts to restrict generally vertical movement of the pin once it is engaged in the respective coupler engagement means. In a particularly preferred embodiment, the pin includes a portion that is of a reduced diameter in the region at which it is engaged by the pivotally mounted locking jaw. Accordingly, the pin surface residing between the two portions of varying diameter above and below the arms of the locking jaw act to restrict generally vertical movement of the pin and prevents removal of the pin from the coupler when it is engaged by the engagement means.

The coupler is removably mountable upon a conventional railway bogie, and is preferably dimensioned such that the forks of a forklift may be located on the underside of the coupler for mounting and demounting the coupler to/from the bogie.

The present invention also provides a coupler suitable for use with the invention including a forwardly projecting coupling means and a rearwardly disposed coupling means.

Preferably the forwardly projecting coupling means includes a generally V shaped member residing in a generally horizontal plane. Additionally, it is preferred that the forwardly projecting coupling means include a forwardly disposed engagement means residing between the arms of the generally V shaped member.

It is further preferred that the forwardly disposed engagement means of the coupler include a generally U shaped jaw pivotally connected to the coupler. It is also preferred that when not in use, the generally U shaped jaw of the forwardly projecting coupling means be biased to a position such that the arms of the U shaped jaw are generally aligned with the arms of the generally V shaped member.

The forwardly projecting engagement means of the coupler also preferably includes a locking means whereupon pivotal movement of the generally U shaped jaw to a position where the arms thereof are generally transverse to the arms of the V shaped member, the locking means is capable of being urged toward the U shaped jaw and abut a portion thereof thereby retaining the U shaped jaw in a locked position. In a particularly preferred embodiment, the locking means of the coupler includes a wedge and additionally the wedge is biased to a position corresponding to the locked position of the U shaped jaw.

In the instance of the forwardly projecting engagement means of the coupler including a biased locking wedge, a retention means may be provided to retain the biased locking wedge in a position corresponding to an unlocked position of the U shaped jaw. In this particular embodiment, the retention means may be released upon pivotal movement of the U shaped jaw thereby enabling the locking wedge to be urged into a position corresponding to the locked position of the U shaped jaw.

In a particularly preferred embodiment, the locking means may be operated manually by way of a linkage. This enables operators of the coupler to manually activate or deactivate the locking means by way the linkage. It is also preferable that the locking means reside in a generally horizontal plane.

Preferably, the coupler also includes a rearwardly disposed coupling means pivotally connected to the coupler with the axis of pivot residing in a generally horizontal plane thereby enabling angular movement of the rearwardly disposed coupling means.

Additionally, it is preferred that the rearwardly disposed coupling means include a generally V shaped member residing in a generally horizontal plane. It is further preferred that the rearwardly disposed coupling means include a rearwardly disposed engagement means residing between the arms of the generally V shaped member.

Further, the rearwardly disposed engagement means may include a generally U shaped jaw pivotally connected to the coupler. In addition, when not in use, it is preferred that the generally U shaped jaw of the rearwardly disposed engagement means be biased to a position such that the arms of the U shaped jaw are generally aligned with the arms of the generally V shaped member. It is also preferable that the rearwardly disposed engagement means include a locking means whereupon pivotal movement of the rearwardly disposed generally U shaped jaw to a position where the arms thereof are generally transverse to the arms of the rearwardly disposed generally V shaped member, the locking means is capable of being urged toward the generally U shaped jaw and abut a portion thereof thereby retaining the U shaped jaw in a locked position.

In an embodiment where the rearwardly disposed engagement means includes a locking means, it is preferable that the locking means includes a wedge. It is also preferred that such a wedge be biased to a position corresponding to the locked position of the rearwardly disposed generally U shaped jaw.

Further, the rearwardly disposed engagement means may include a rearwardly disposed retention means to retain the biased locking wedge in a position corresponding to an unlocked position of the rearwardly disposed generally U shaped jaw. In a particularly preferred embodiment the retention means is released upon pivotal movement of the U shaped jaw thereby enabling the locking wedge to be urged into a position corresponding to the locked position of the rearwardly disposed generally U shaped jaw.

DETAILED DESCRIPTION OF THE PREFERRED EMBODIMENT

The present invention will now be described in relation to a preferred embodiment. However, it is to be appreciated that the following description is not to limit the generality of the above description. The description of the preferred embodiment refers to the accompanying drawings in which:

FIG. 1 is a side view detailing the preferred embodiment of the coupling arrangement with the various members decoupled;

FIG. 2 is a side view of the preferred embodiment of FIG. 1 detailing the various members in a coupled state;

Figure 11B:
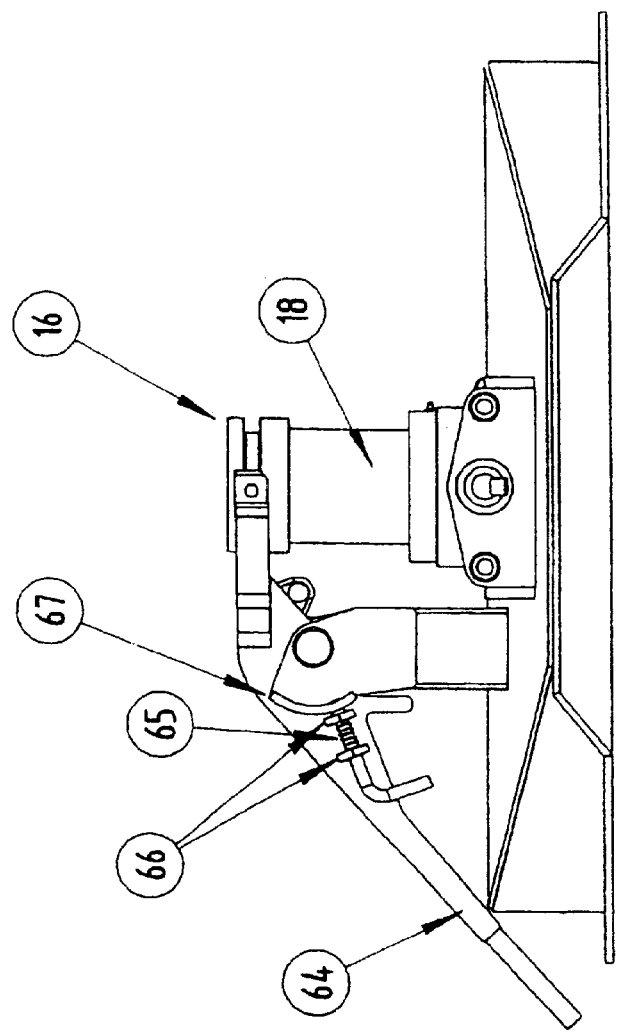
Figure 11A:
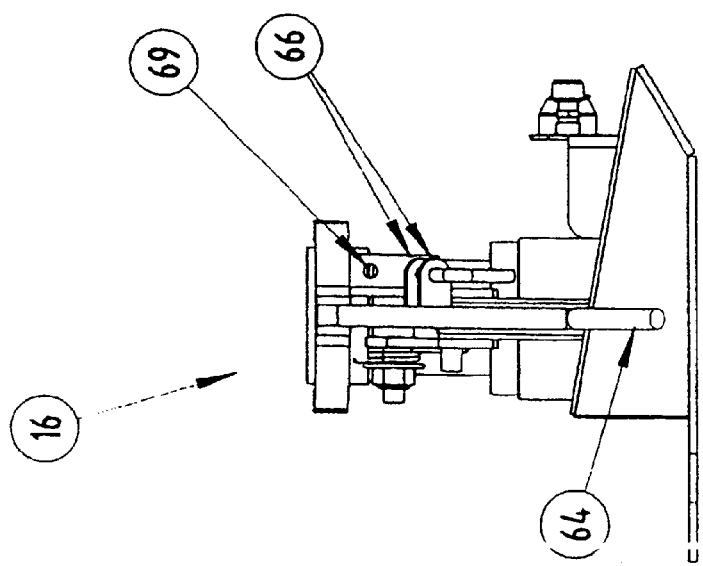
Figure 12B:
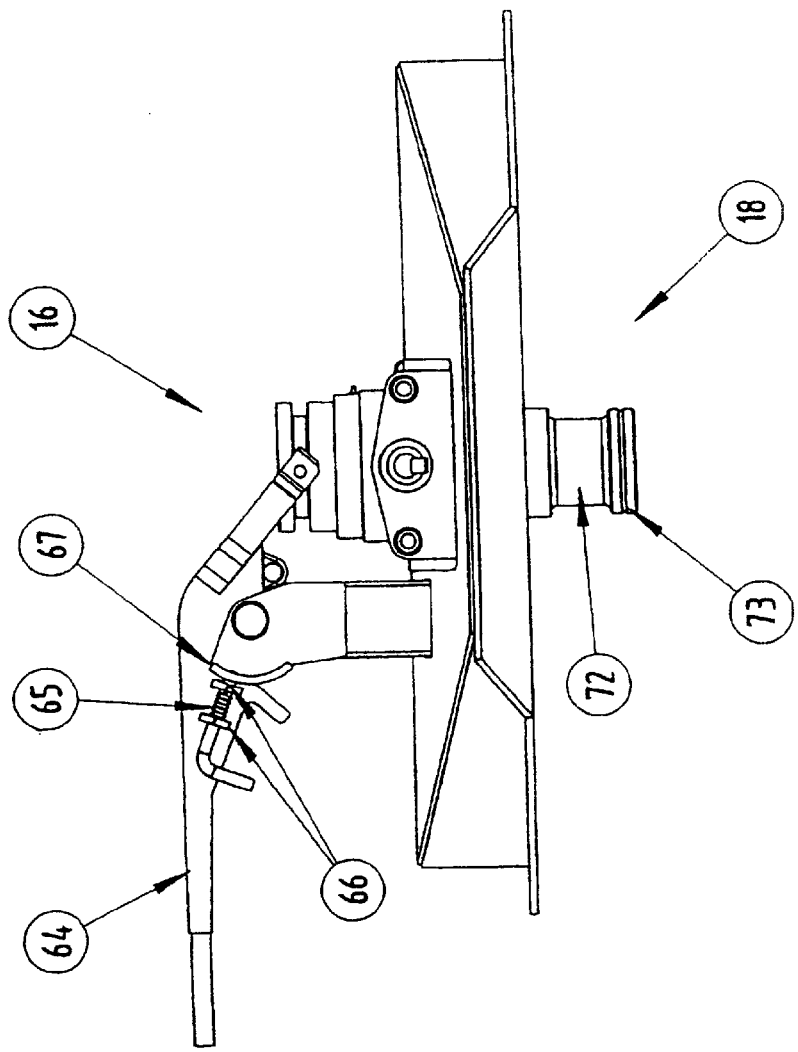
Figure 12A:
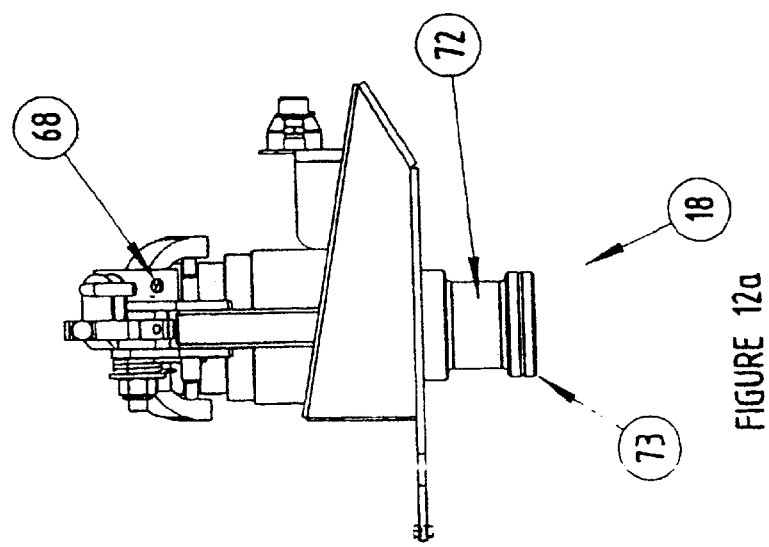
Figure 13:
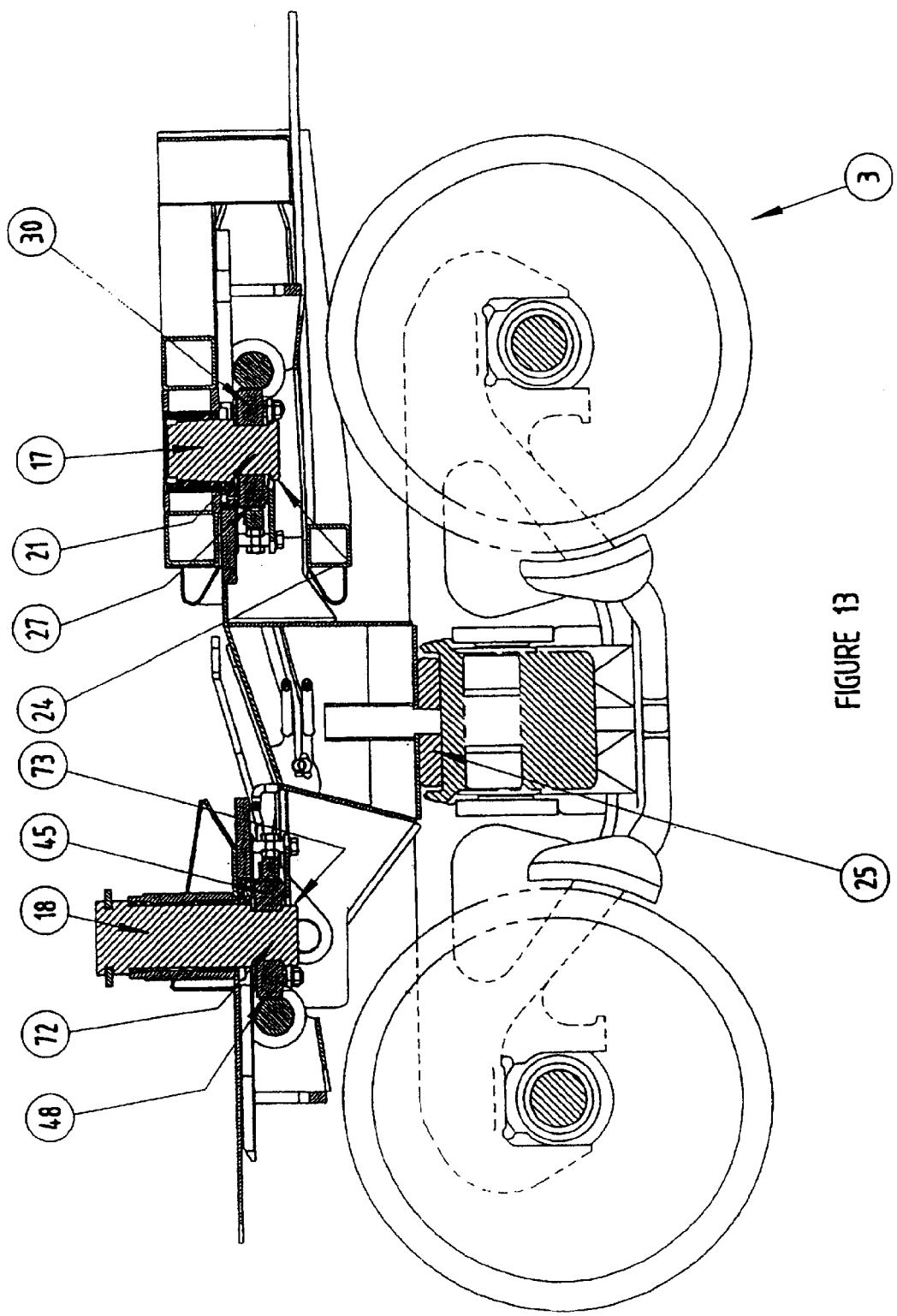

FIGS. 11a and 11b detail a side and end view respectively of the retractable locating means of the following trailer of FIG. 1 with its pin in a retracted position;

FIGS. 12a and 12b detail a side and end view respectively of the retractable locating means of the following trailer of FIG. 1 with its pin in an extended position; and FIG. 13 is a partially sectioned side view of the coupler and bogie arrangement engaged with the pins of the leading and following trailers of FIG. 1 detailing the relative locations of the engagement means and the pins.

With reference to FIG. 1 a side view of a preferred embodiment detailing the various members of the coupling arrangement is provided and identifies a leading trailer 1, a following trailer 2, and a coupler 5 mounted upon a conventional railway bogie 3. In addition, FIG. 1 also details a retractable highway wheel assembly 4 associated with the leading trailer 1. Whereas FIG. 1 provides a side view of the various members in a decoupled state, FIG. 2 details the various members in a coupled state and in particular, details the highway wheel assembly 4 of leading trailer 1 in a raised or retracted position. In FIG. 1 the leading trailer 1 is in a "road" mode whereas in FIG. 2, the leading trailer 1 is in a "rail" mode.

It is of particular importance that no interference occur between the highway wheel assembly 4 of the leading trailer 1 and any part of the conventional railway bogie 3 or the coupler 5. In this regard, there should be no interference in either the uncoupled or coupled state of the coupling arrangement nor during the operation of the retractable highway wheel assembly 4. As a result a sliding mechanism is not required on the leading trailer 1 to slide the retractable highway wheel assembly 4 away from the coupler 5 and the conventional railway bogie 3.

FIGS. 1 and 2 also detail a rearwardly disposed locating means 12 of leading trailer 1, and a forwardly disposed locating means 16 of following trailer 2. In addition, a forwardly projecting coupling means 7 and a rearwardly disposed coupling means 8 are also detailed.

Figure 3:
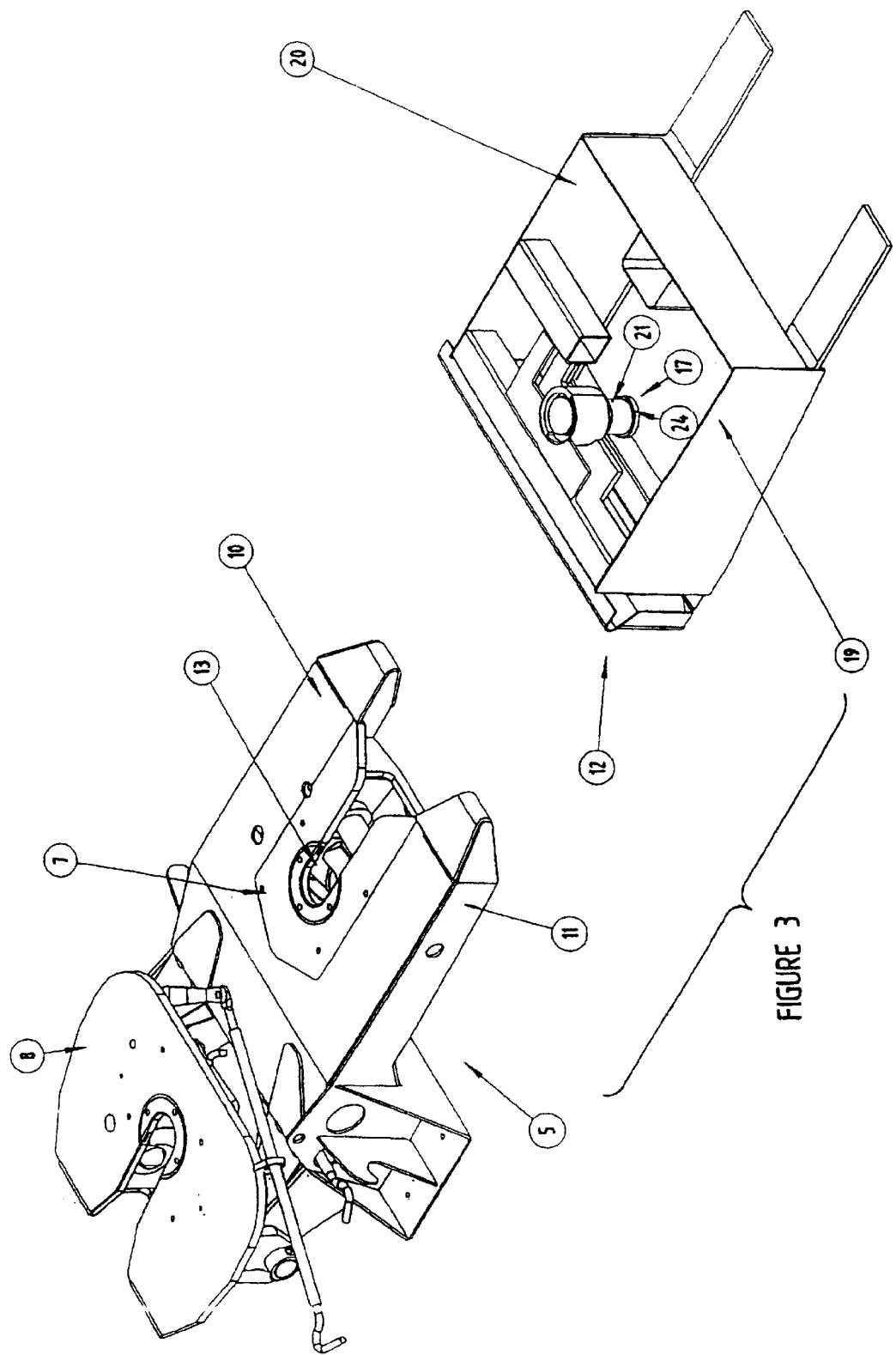
FIG. 3 is a perspective view of the preferred embodiment of the coupler in alignment with the locating means of the leading trailer of FIG. 1.

FIG. 3 provides a perspective view of the preferred embodiment of the coupler 5 generally aligned with the locating means 12 of the leading trailer 1. In this figure the conventional railway bogie 3 and the leading trailer 1 have been omitted for clarity.

FIG. 3 details the forwardly projecting coupling means 7 as including two arms 10 and 11, with a generally V shaped member being formed between the free ends thereof. In addition, the forwardly projecting coupling means 7 includes a forwardly disposed engagement means 13 residing between arms 10 and 11.

FIG. 3 also details the rearwardly disposed locating means 12 as including side walls 19 and 20 and a locating pin 17 which in the preferred embodiment includes a reduced diameter portion 21 and a flange 24.

Upon urging of the coupler 5 and the rearwardly disposed locating means 12 toward each other the generally V shaped member residing between arms 10 and 11 gathers the travel of the locking pin 17 toward the engagement means 13. The generally V shaped member does not extend the full length of the arms 10, 11 and thus with a portion of the travel of the locating pin 17 toward the engagement means 13 occurs through a passage formed between the arms 10 an 11. The extent to which the generally V shaped member residing between the arms 10 and 11 extends toward the engagement means 13 depends upon the specific configuration of the locating pin 17 and the materials used to form the pin 17, arms 10 and 11 and the generally V shaped member. The V shaped member is formed with sufficient dimensions to enable the forwardly projecting coupling means 7 to gather and locate the locating pin 17.

Figure 4:
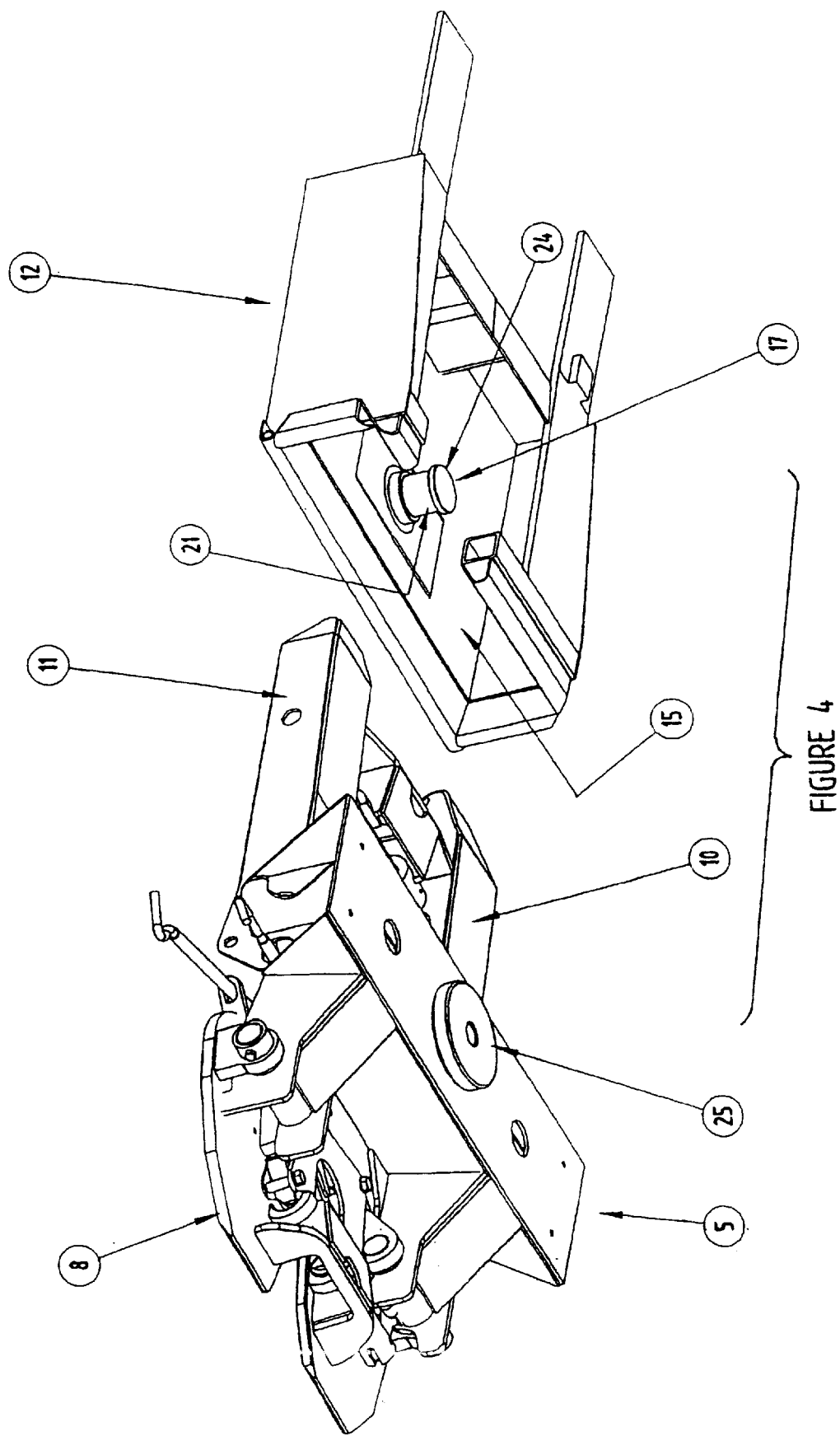
FIG. 4 is an perspective view of the coupler and locating means from the underside of the coupler.

FIG. 4 shows a perspective underside view of the components detailed in FIG. 3 and in particular details the opening 15 of the locating means 12 of the leading trailer 1. In addition, FIG. 4 also details a coupler boss 25 which in combination with a suitably dimensioned recess in the conventional railway bogie 3 provides for a removable pivotable mounting thereupon.

Figure 5:
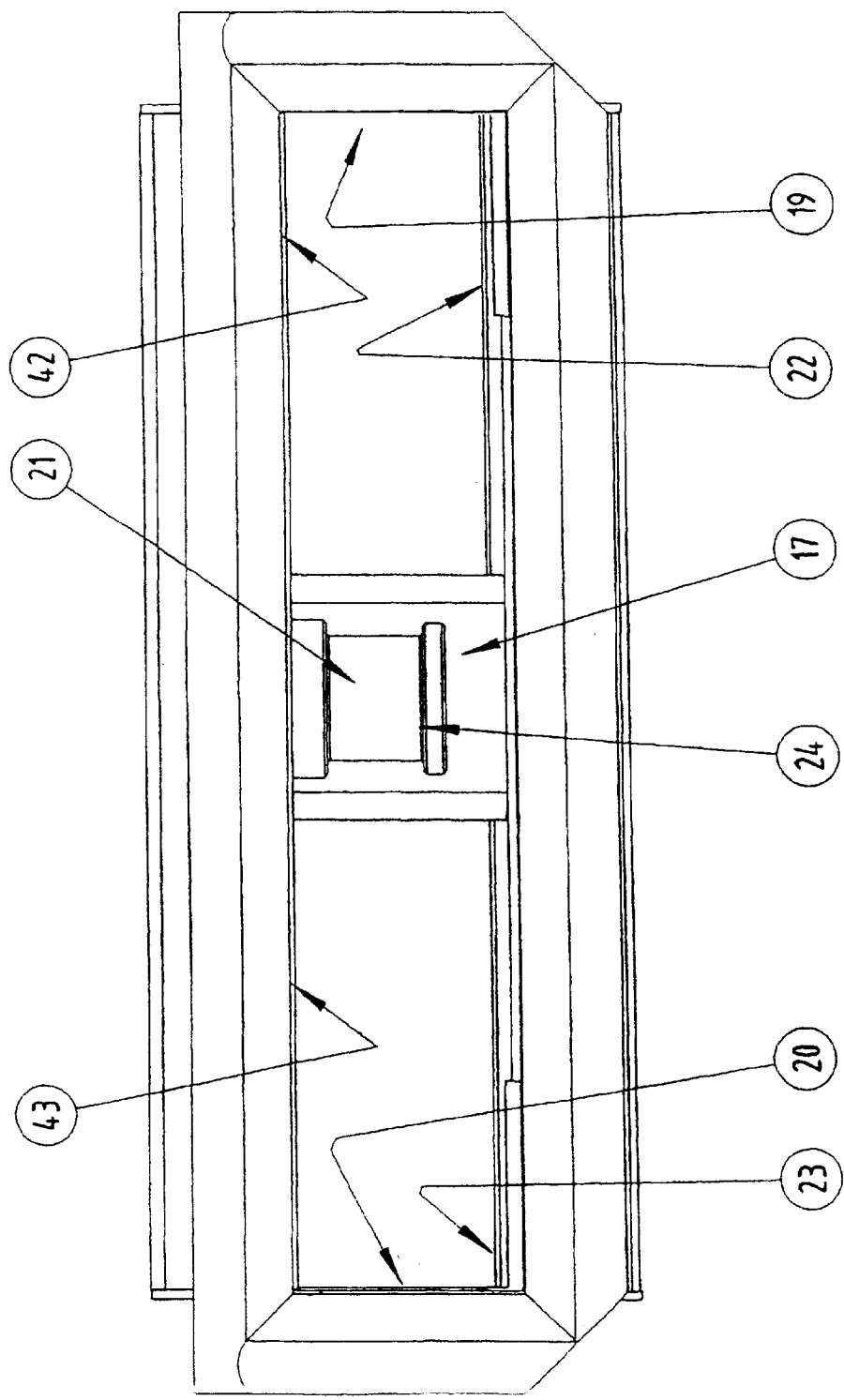
FIG. 5 is an end view of the locating means of the leading trailer of FIG. 1 detailing the entry to the receptacle of the locating means.
Figure 6:
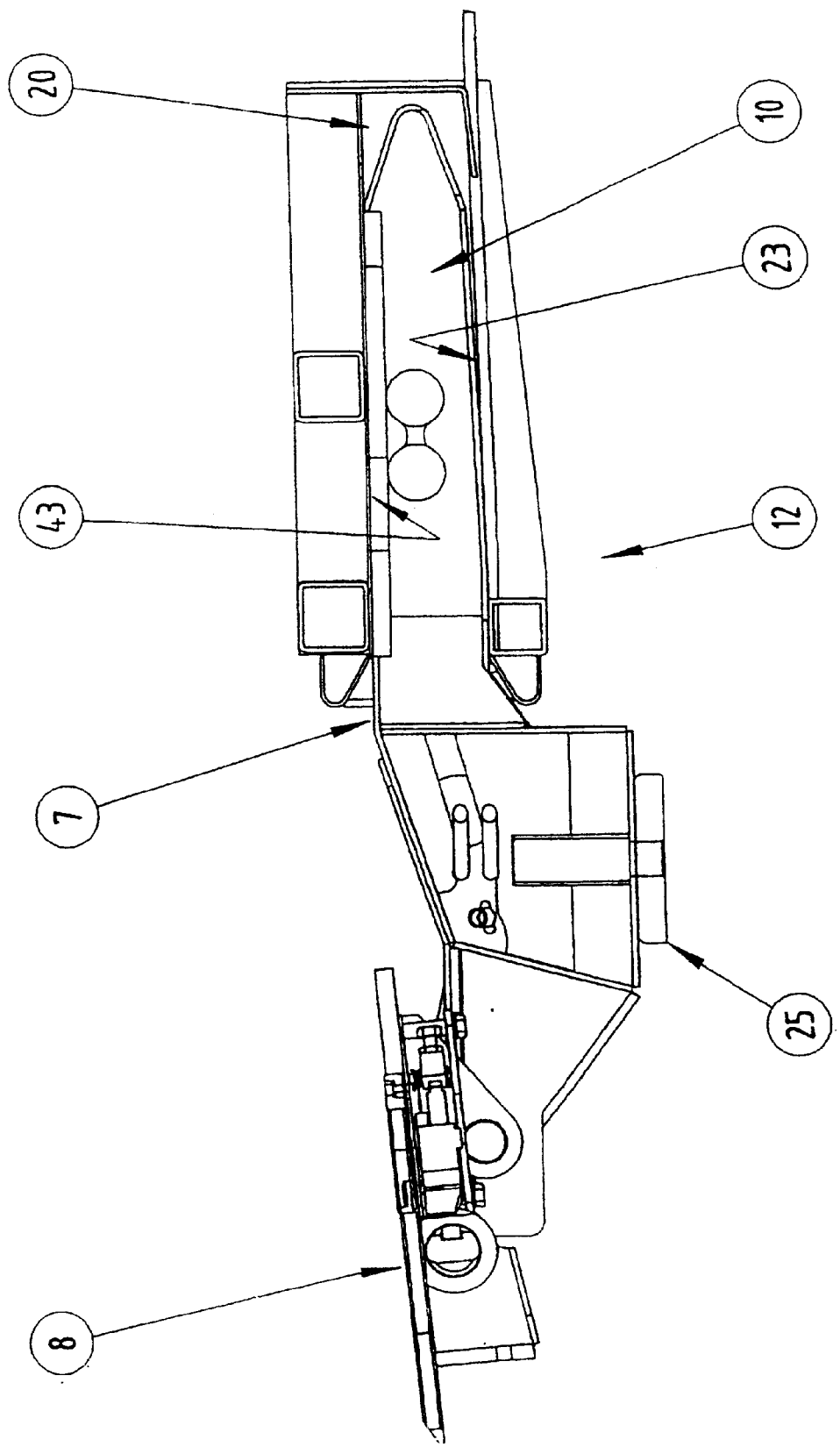
FIG. 6 is sectioned side view of the coupler of FIG. 1 in engagement with the locating means of the leading trailer detailing the contact between the coupler V shaped member and the load bearing surfaces in the locating means.

FIG. 5 shows an end view of the locating means 12 and in particular details the load bearing surfaces 22 and 23 upon which the arms 10 and 11 of the forwardly projecting coupling means 7 rest when in a coupled state. When engaged and in use, the arms 10 and 11 of the forwardly projecting coupling means 7 rest upon the load bearing surfaces 22 and 23 and exert a generally vertical downward force thereupon. In addition, arms 10 and 11 contact and exert a generally vertically upward force upon the load bearing surfaces 42 and 43 and in this manner the arms 10 and 11 are captured within the locating means 12. FIG. 6 provides a sectioned side view of the coupler of FIG. 1 in engagement with the locating means 12 detailing the relative location of the arm 10 with respect to the locating means 12 and the load bearing surfaces 23 and 43.

Arms 10 and 11 are captured within the locating means 12 so as to form a generally rigid beam from the rear of the leading trailer 1 to the bogie 3. this enables the bogie 3 to be maintained at a sufficient distance from the rear of the trailer 1 to enable the highway wheel assembly 4 to be raised or lowered without interference with the bogie 3.

Figure 7:
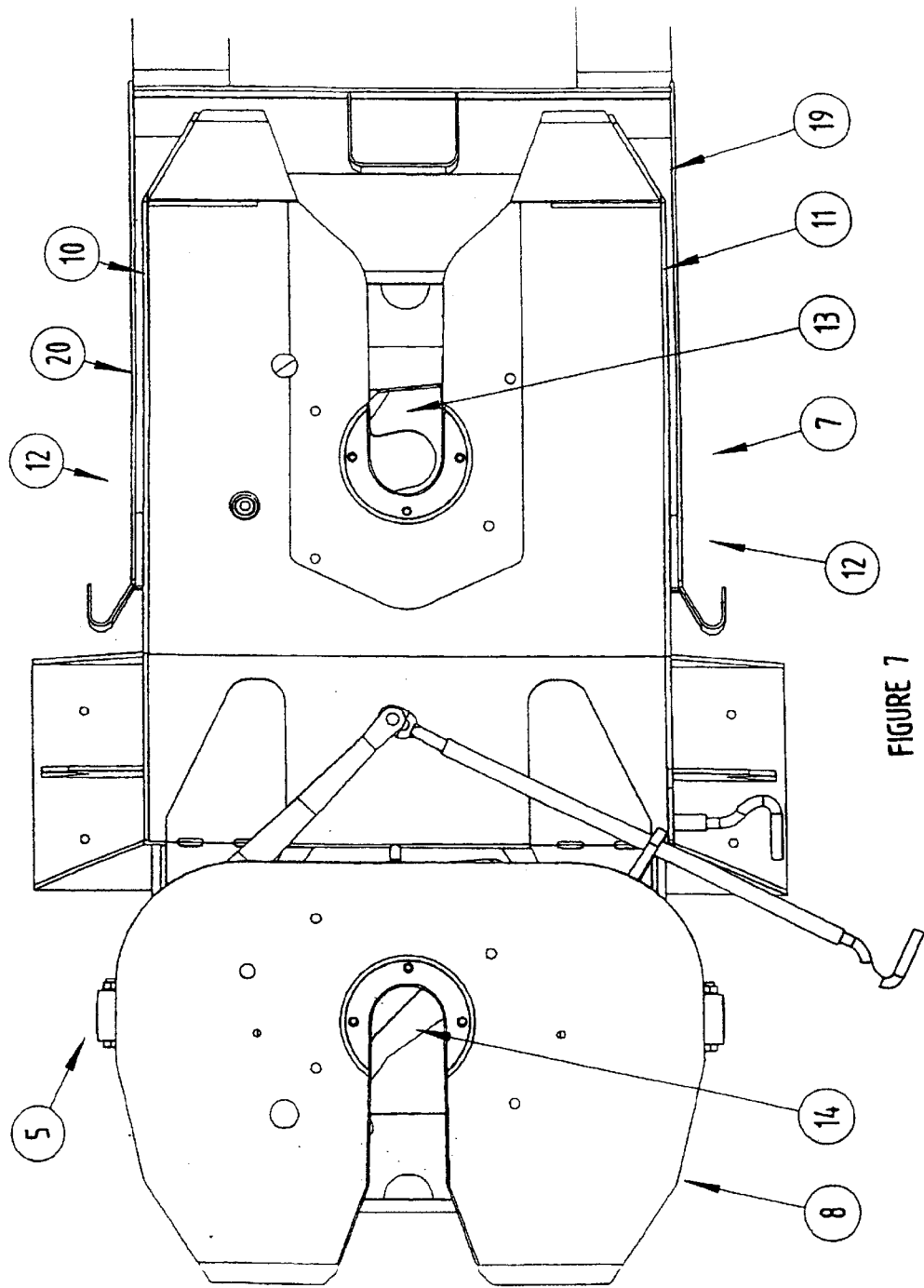
FIG. 7 is a plan view of the top side of the coupler of FIG. 1 in relation to the outer walls of the receptacle of the locating means.

FIG. 7 details an internal plan view of the coupler 5 of FIG. 1 engaged in the locating means 12. When the coupler 5 and the locating means 12 are engaged there is no contact between the outer sides of arms 10 and 11 and the side walls 19 and 20 of the locating means 12. During the engagement process between the coupler 5 and locating means 12, the generally V shaped member residing between arms 10 and 11 contacts the surface of the locating pin 17 which acts to centrally locate the forwardly projecting coupling means 7 in the locating means 12.

Figure 8:
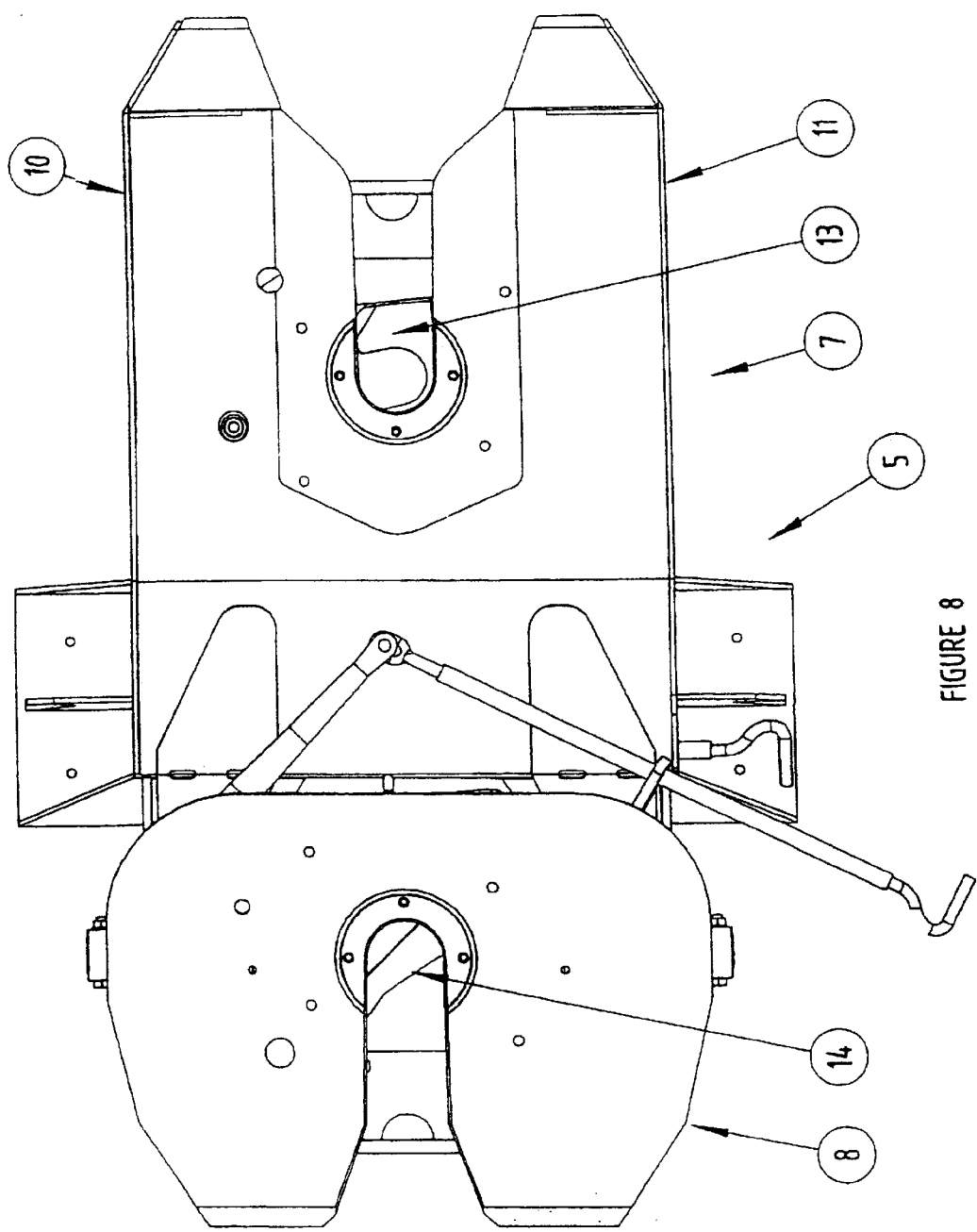
FIG. 8 is a plan view of the upper side of the coupler of FIG. 1.

FIG. 8 provides a similar plan view of the upper side of the coupler of FIG. 1.

Figure 9:
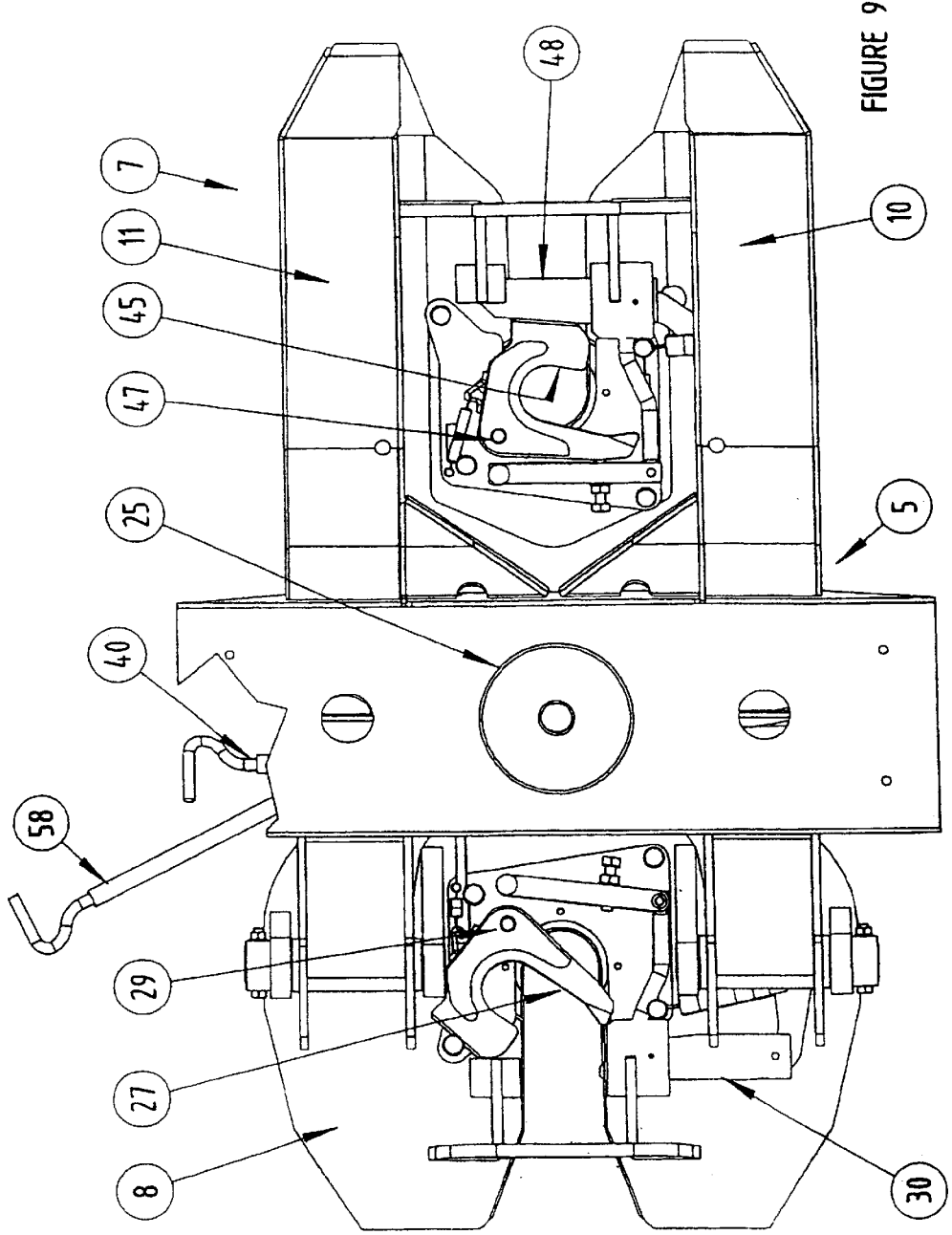
FIG. 9 is plan view of the underside of the coupler of FIG. 1.

FIG. 9 details the various component parts of the forwardly projecting coupling means 7 and the rearwardly projecting coupling means 8. In particular, the component parts of the forwardly disposed engagement means 13 and the rearwardly disposed engagement means 14 are shown.

The rearwardly disposed engagement means 14 includes a generally U shaped jaw 27 pivotally connected to the coupler 5 by way of a pivot pin 29. Also detailed in FIG. 9 is the locking wedge 30 of the rearwardly disposed engagement means 14.

The forwardly disposed engagement means 13 includes a generally U shaped jaw 45 pivotally connected to the coupler 5 by way of a pivot pin 47. Additionally, locking wedge 48 of the forwardly disposed engagement means 13 is detailed. Although the respective locating pins are not detailed in FIG. 9, the forwardly disposed engagement means 13 is detailed in a locked position with the locking wedge 48 abutting one arm of the generally U shaped jaw 45 thereby retaining the jaw 45 in its locked position. The rearwardly disposed engagement means 14 is in the unlocked position.

Figure 10:
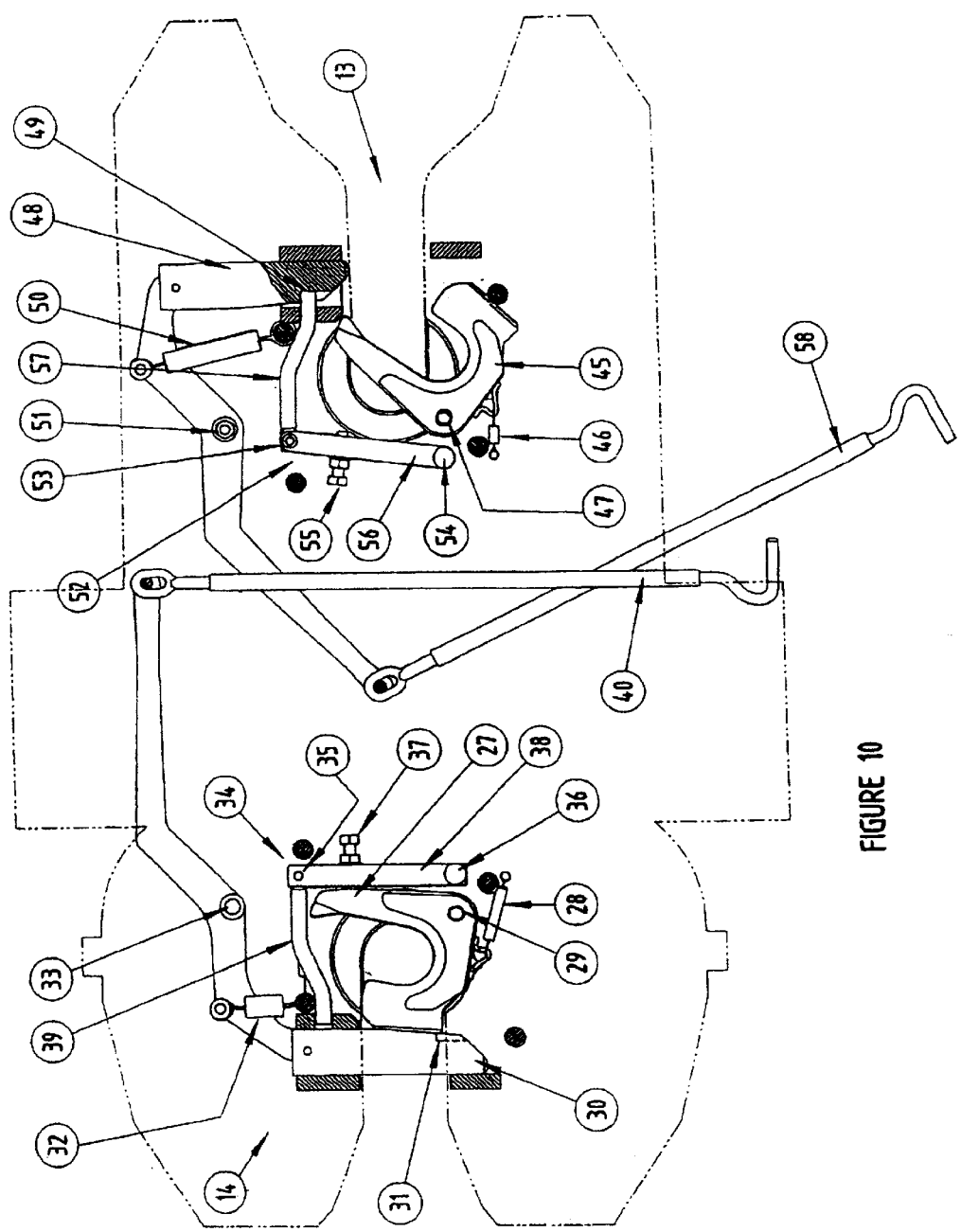
FIG. 10 is a plan view of the upper side of the engagement means of the coupler of FIG. 1 with the outer walls of the coupler detailed in dashed outline.

Greater detail of the component parts of the engagement means 13 and 14 is provided in FIG. 10 wherein a plan view of the upper side of the engagement means is provided with component parts of the coupler 5 that would normally obstruct the view thereof being removed. In addition, the outer walls of the couple 5 have been detailed in dashed outline to indicate the relative locations of the engagement means 13 and 14 in relation to the coupler 5.

As can be seen from FIG. 10, the rearwardly disposed engagement means 14 is detailed in its locked position whereas the forwardly disposed engagement means 13 is detailed in its unlocked position.

Being in its unlocked position, the forwardly disposed engagement means 13 is ready to receive a locating pin 17. The generally U shaped jaw 45 is retained in the unlocked position by a bias from spring 46. Locking wedge 48 is retained in the unlocked position against a bias in the form of spring 50 by a retention member 57. The free end of the retention member 57 is located in a recess 49 in the locking wedge 48. The retention member 57 forms part of the locking wedge retention and release assembly 52 which also includes member 56, pivots 53 and 54, and adjustable shaft 55.

Also detailed in FIG. 10 is the rearwardly disposed engagement means 14 in a locked position. Each of the engagement means 13 and 14 have corresponding parts and the operation of each engagement means is similar. Accordingly, operation of the rearwardly disposed engagement means 14 will only be described. In moving from an unlocked to a locked position, the generally U shaped jaw 27, pivots about its connection 29 against its bias (in this instance in the form of spring 28). Pivotal movement of the generally U shaped jaw 27 is intended to occur after the jaw 27 in its open position has received a locating pin. It is the momentum of the connecting locking pin that causes the pivotal motion of the jaw 27. As a result of this pivotal motion, the generally U shaped jaw 27 abuts the adjustable shaft 37 and exerts a force upon the locking shaft retention and release assembly 34. In so doing, the retention member 39 is withdrawn from its location in the recess 31 of the locking wedge 30 thereby enabling the locking wedge 30 to traverse from its unlocked position to its locked position in accordance with a bias in the form of spring 32. To unlock the engagement means 14 thereby enabling the release of a locating pin 18, an operator pulls handle 40 causing pivotal motion of the linkage about pin 33, thus withdrawing the locking wedge 30 to its unlocked position. At the same time, the locking wedge retention and release assembly 34 is urged by a bias to insert retaining member 39 into the locking wedge recess 31. Additionally, the spring 28 also urges the jaw 27 into an unlocked position thereby enabling the free movement of a locking pin away from the engagement means 14.

FIGS. 11*a* and 11*b* detail a side and end view respectively of the preferred embodiment of the forwardly disposed locating means 16 of the following trailers. The forwardly disposed locating means 16 includes a locating pin 18 which in FIGS. 11*a* and 11*b* is detailed in a retracted or withdrawn position. To retain the retractable pin 18 in its withdrawn position a relatively simple locking means in the form of lugs 66 with a threaded shaft disposed there between which can be inserted into apertures situated in lug 67 is provided.

FIGS. 12a and 12b detail the forwardly disposed locating means 16 with the locating means pin 18 in an extended or operational position. The retraction or extension of the locating means pin 18 may be effected by way of handle 64.

Similar to the rearwardly disposed locating pin 17 of the leading trailer, the pin 18 of the following trailer has a reduced diameter portion 72 and a flange 73.

FIG. 13 provides a partially sectioned side view of the coupler 5 and bogie 3 arrangement with the pins 17 and 18 of the leading and following trailers engaged in respective engagement means 14 and 16. It will be recognised that the jaws 45 and 30 of the rearwardly and forwardly disposed engagement means 14 and 16 respectively, receive the reduced diameter portion of the pin 17 and 18 therein. As a result, once engaged, the pins 17 and 18 cannot withdraw vertically from the engagement means 13 and 14 respectively because of the contact with the flanges 24 and 73 respectively.

Finally, it will be appreciated that there may be other modifications and alterations made to the configurations described herein that are also within the scope of the present invention.

What is claimed is:

1. A coupling arrangement for forming a train of highway trailers including
   at least one leading trailer including a rearwardly disposed locating means and a retractable highway wheel assembly;
   at least one following trailer including a forwardly disposed locating means and a retractable highway wheel assembly; and
   a coupler removably and pivotally mounted upon a conventional railway bogie, the coupler including a forwardly projecting coupling means and a rearwardly disposed coupling means, the forwardly projecting coupling means capable of engagement with the leading trailer's rearwardly disposed locating means and the reawardly disposed coupling means capable of engagement with the following trailer's forwardly disposed locating means so that upon engagement of the respective coupling means with the respective locating means, the forwardly projecting coupling means forms a generally rigid beam from the rear of the leading trailer to the interface between the coupler and the railway bogie, and upon generally vertical retraction of the leading trailer highway wheel assembly to the underside thereof, no interference between the highway wheel assembly and the railway bogie occurs; and
   the forwardly projecting coupling means including a generally V shaped member residing in a generally horizontal plane and the rearwardly disposed locating means including a generally vertically aligned pin such that upon general alignment of the forwardly projecting coupling means with the rearwardly disposed locating means and urging of the coupling means and the locating means toward each other the V shaped member gathers the pin between the arms thereof and thus locates the pin therebetween, the forwardly projecting coupling means including a forwardly disposed engagement means located between the arms of the V shaped member, the engagement means capable of releasably engaging and locking the pin of the rearwardly disposed locating means thereby retaining the arms of the V shaped member in abutment with the load bearing surfaces of the rearwardly disposed locating means; and
   the forwardly disposed engagement means including a generally U shaped jaw pivotally connected to the coupler and adapted to receive and lock the locating means pin between the arms of the generally U shaped jaw at a terminal end of the V shaped member.

2. A coupling arrangement according to claim 1 wherein the rearwardly disposed locating means includes at least one load bearing surface that will resist a generally vertically downwardly directed force and at least one load bearing surface that will resist a generally vertically upwardly directed force.

3. A coupling arrangement according to claim 2 wherein, in use, at least a section of the forwardly projecting coupling means abuts the at least one load bearing surface resisting generally vertically upwardly directed forces and at least a section of the forwardly projecting coupling means abuts the at least one load bearing surface resisting generally vertically downwardly directed forces.

4. A coupling arrangement according to claim 1 wherein, when not in use, the generally U shaped jaw is biased to a position such that the arms of the jaw are generally aligned with the arms of the generally V shaped member such that the pin of the rearwardly disposed locating means may be received between the arms of the jaw.

5. A coupling arrangement according to claim 4 wherein upon general alignment of the forwardly projecting coupling means with the rearwardly disposed locating means and urging of the coupling means and the locating means toward each other, the arms of the V shaped member gathers the locating means pin and directs the pin toward the arms of the generally U shaped jaw, whereupon receipt of the pin between the arms of the jaw and the momentum of the pin causes the U shaped jaw to pivot about its connection, the extent of pivotal movement of the jaw being sufficient to locate the arms of the U shaped jaw generally transverse to the direction of the arms of the V shaped member, the arms of the U shaped jaw thereby restricting free movement of the pin away from the engagement means.

6. A coupling arrangement according to claim 5 wherein the forwardly projecting engagement means includes a locking means whereupon receipt of the pin into the U shaped jaw and pivoting thereof to a generally transverse position, the locking means is capable of being urged toward the U shaped jaw and abut a portion thereof thereby retaining the U shaped jaw in a locked position thus engaging the pin.

7. A coupling arrangement according to claim 6 wherein the forwardly projecting engagement means includes a retention means to retain the biased locking wedge in position corresponding to an unlocked position of the U shaped jaw.

8. A coupling arrangement according to claim 7 wherein the retention means is released upon pivotal movement of the U shaped jaw thereby enabling the locking wedge to be urged into a position corresponding to the locked position of the U shaped jaw.

9. A coupling arrangement according to claim 1 wherein the rearwardly disposed coupling means is pivotally connected to the coupler with the aixs of pivot residing in a generally horizontal plane thereby enabling angular movement of the coupling means with respect to the following trailer.

10. A coupling arrangement according to claim 1 wherein the rearwardly disposed coupling means includes a generally V shaped member residing in a generally horizontal plane and the forwardly disposed locating means includes a generally vertically aligned pin such that upon general alignment of the rearwardly disposed coupling means with the forwardly disposed locating means and urging of the coupling means and the locating means toward each other the V shaped member gathers the pin between the arms thereof and thus locates the pin therebetween.

11. A coupling arrangement according to claim 10 wherein the rearwardly disposed coupling means includes a rearwardly disposed engagement means between the arms of the generally V shaped member, the engagement means capable of releasably engaging the pin of the forwardly disposed locating means.

12. A coupling arrangement according to claim 11 wherein the rearwardly disposed engagement means includes a generally U shaped jaw pivotally connected to the coupler and adapted to receive the forwardly disposed locating means pin between the arms of the generally U shaped jaw.

13. A coupling arrangement according to claim 12 wherein, when not in use, the generally U shaped jaw of the rearwardly disposed engagement means is biased to a position such that the arms of the generally U shaped are generally aligned with the arms of the generally V shaped member of the rearwardly disposed coupling means such that the pin of the forwardly disposed locating means may be received between the arms of the rearwardly disposed jaw.

14. A coupling arrangement according to claim 13 wherein upon general alignment of the rearwardly projecting coupling means with the forwardly disposed locating means and urging of the coupling means and the locating means toward each other, the arms of the V shaped member gathers the locating means pin and directs the pin toward the arms of the generally U shaped rearwardly disposed jaw, whereupon receipt of the pin between the arms of the jaw and the momentum of the pin causes the U shaped jaw to pivot about its connection, the extent of pivotal movement of the jaw being sufficient to locate the arms of the U shaped jaw generally transverse to the direction of the arms of the rearwardly disposed V shaped member, the arms of the U shaped jaw thereby restricting free movement of the pin away from the rearwardly disposed engagement means.

15. A coupling arrangement according to claim 14 wherein the rearwardly disposed engagement means includes a locking means whereupon receipt of the pin into the rearwardly disposed generally U shaped jaw and pivoting thereof to a generally transverse position, the locking means is capable of being urged toward the U shaped jaw and abut a portion thereof thereby retaining the U shaped jaw in a locked position thus engaging the pin.

16. A coupling arrangement according to claim 15 wherein the locking means of the rearwardly disposed engagement means or the locking means of the forwardly projecting engagement means includes a wedge.

17. A coupling arrangement according to claim 16 wherein the locking wedge is biased to the locked position.

18. A coupling arrangement according to claim 17 wherein the rearwardly disposed engagement means includes a retention means to retain the biased locking wedge of the rearwardly disposed engagement means in a position allowing pivotal movement of the rearwardly disposed U shaped jaw.

19. A coupling arrangement according to claim 18 wherein the retention means of the rearwardly disposed engagement means is released upon pivotal movement of the rearwardly disposed jaw thereby enabling the locking wedge of the rearwardly disposed engagement means to be urged into a position corresponding to the locked position of the rearwardly disposed U shaped jaw.

20. A coupling arrangement according to claim 14 wherein the locking means of the rearwardly disposed engagement means may be operated by manual operation of a linkage.

21. A coupling arrangement according to claim 14 wherein the locking means of the rearwardly disposed engagement means resides in a generally horizontal plane.

22. A coupling arrangement according to claim 1 wherein the forwardly disposed locating means pin is capable of vertical movement between a retracted, non-operational position, and an extended operational position.

23. A coupling arrangement according to claim 22 wherein the pin in the retracted position resides at a greater height than when in the extended position.

24. A coupling arrangement according to claim 1 wherein the rearwardly disposed locating means pin includes a generally radially outwardly directed flange along the length thereof acting to prevent removal of the pin from the forwardly disposed engagement means when the pin is engaged therein.

25. A coupling arrangement according to claim 9 wherein the forwardly disposed locating means pin includes a generally radially outwardly directed flange along the length thereof acting to prevent removal of the pin from the rearwardly disposed engagement means when the pin is engaged therein.

26. A coupler for use in the coupling arrangement according to claim 1 including a forwardly projecting coupling means and a rearwardly disposed coupling means.

* * * * *